April 10, 1934.  R. C. LIVESAY  1,954,630
HARVESTER
Filed Feb. 12, 1932   6 Sheets-Sheet 2
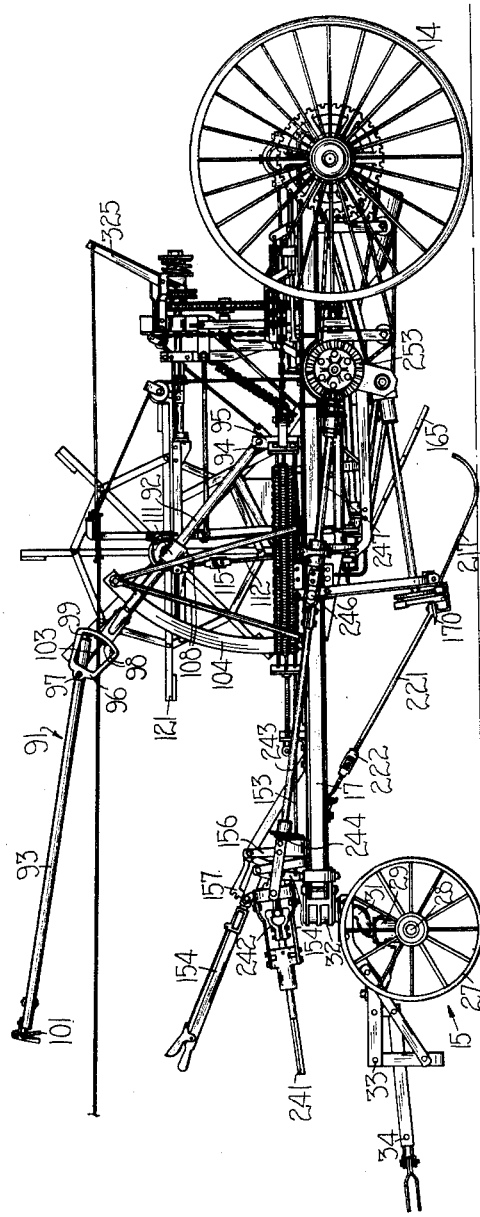
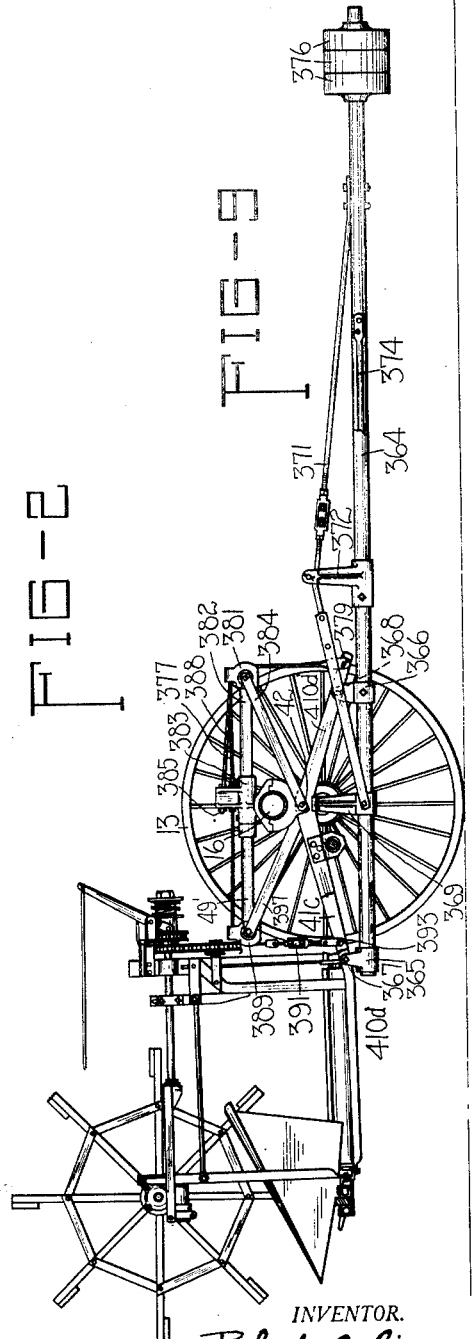
INVENTOR.
Robert C. Livesay
BY Brown, Jackson
Boettcher & Duerner
ATTORNEYS
WITNESS
WALTER ACKERMAN April 10, 1934.   R. C. LIVESAY   1,954,630
HARVESTER
Filed Feb. 12, 1932   6 Sheets-Sheet 3
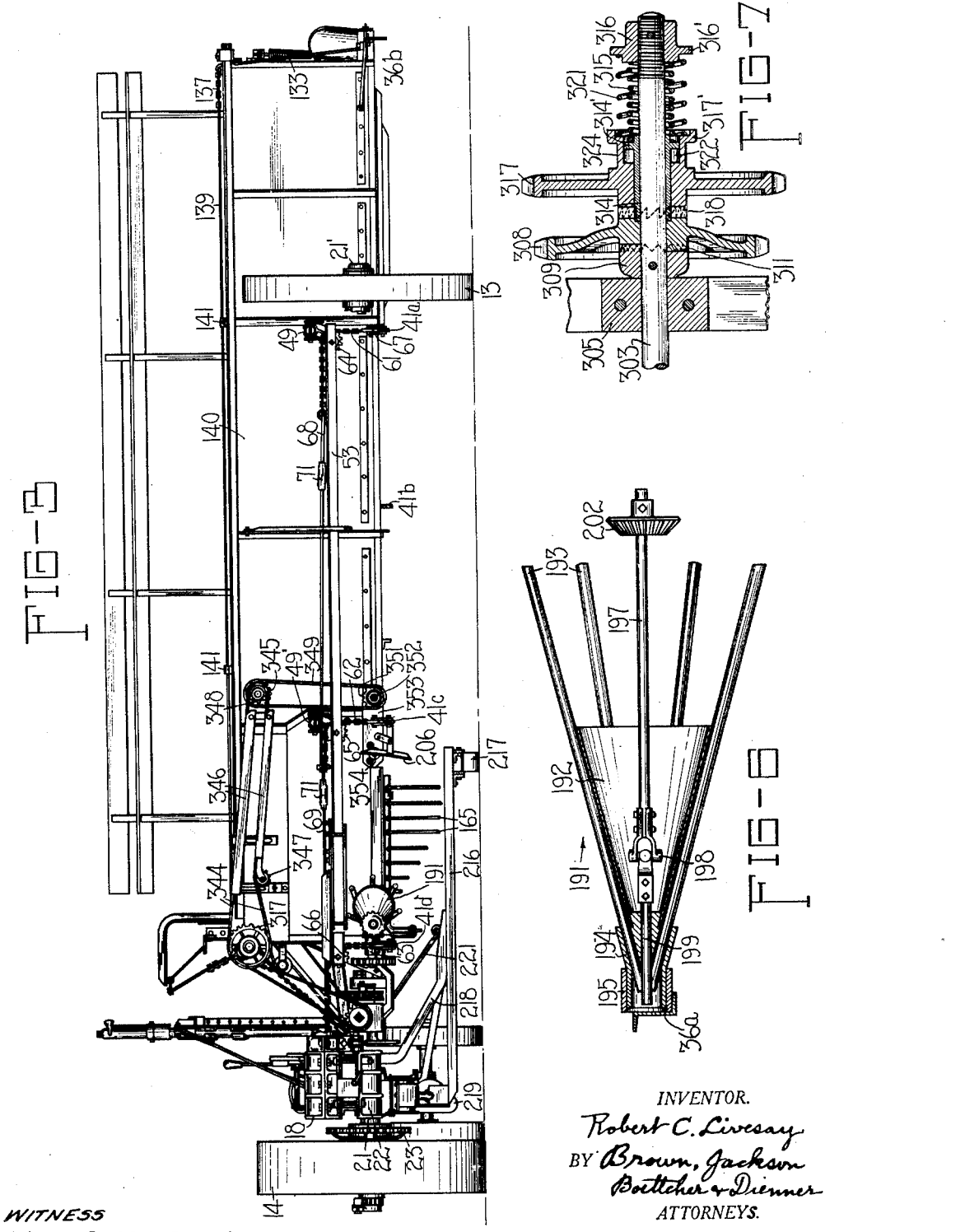
INVENTOR.
Robert C. Livesay
BY Brown, Jackson
Boettcher & Dienner
ATTORNEYS.
WITNESS
WALTER ACKERMAN April 10, 1934.  R. C. LIVESAY  1,954,630
HARVESTER
Filed Feb. 12, 1932   6 Sheets-Sheet 4
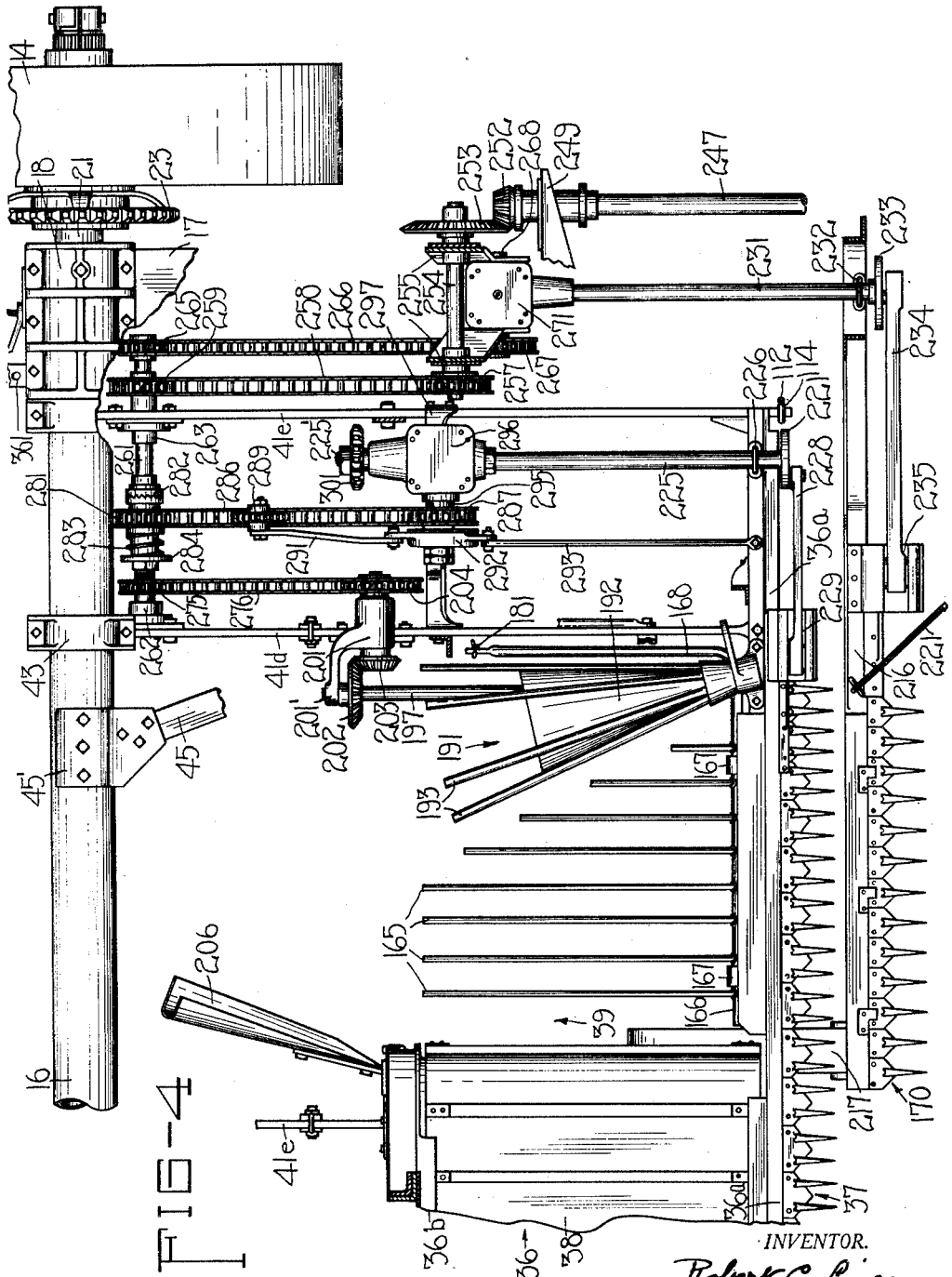
INVENTOR.
Robert C. Livesay
BY Brown, Jackson
Boettcher & Dienner
ATTORNEYS.
WITNESS
WALTER ACKERMAN

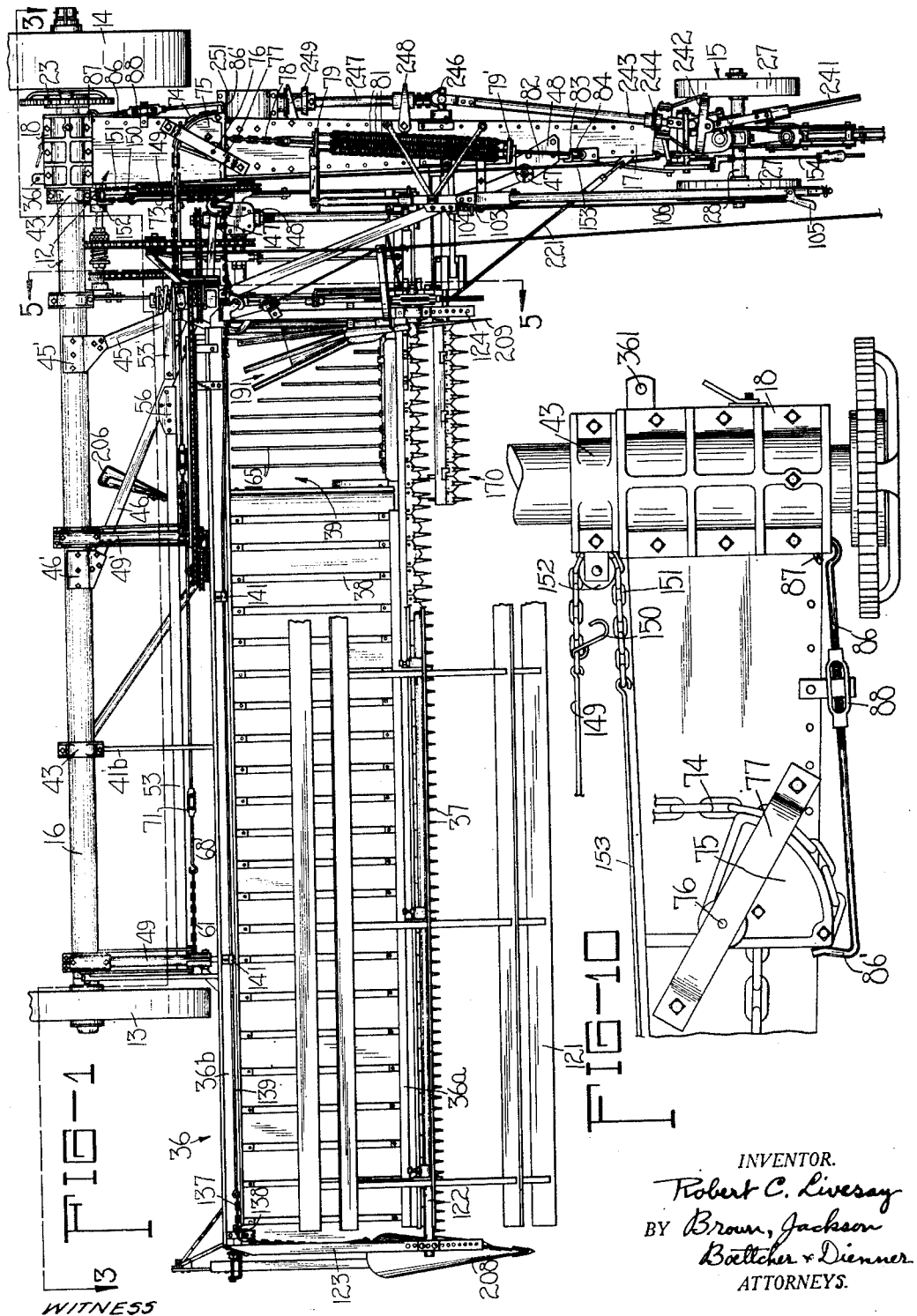

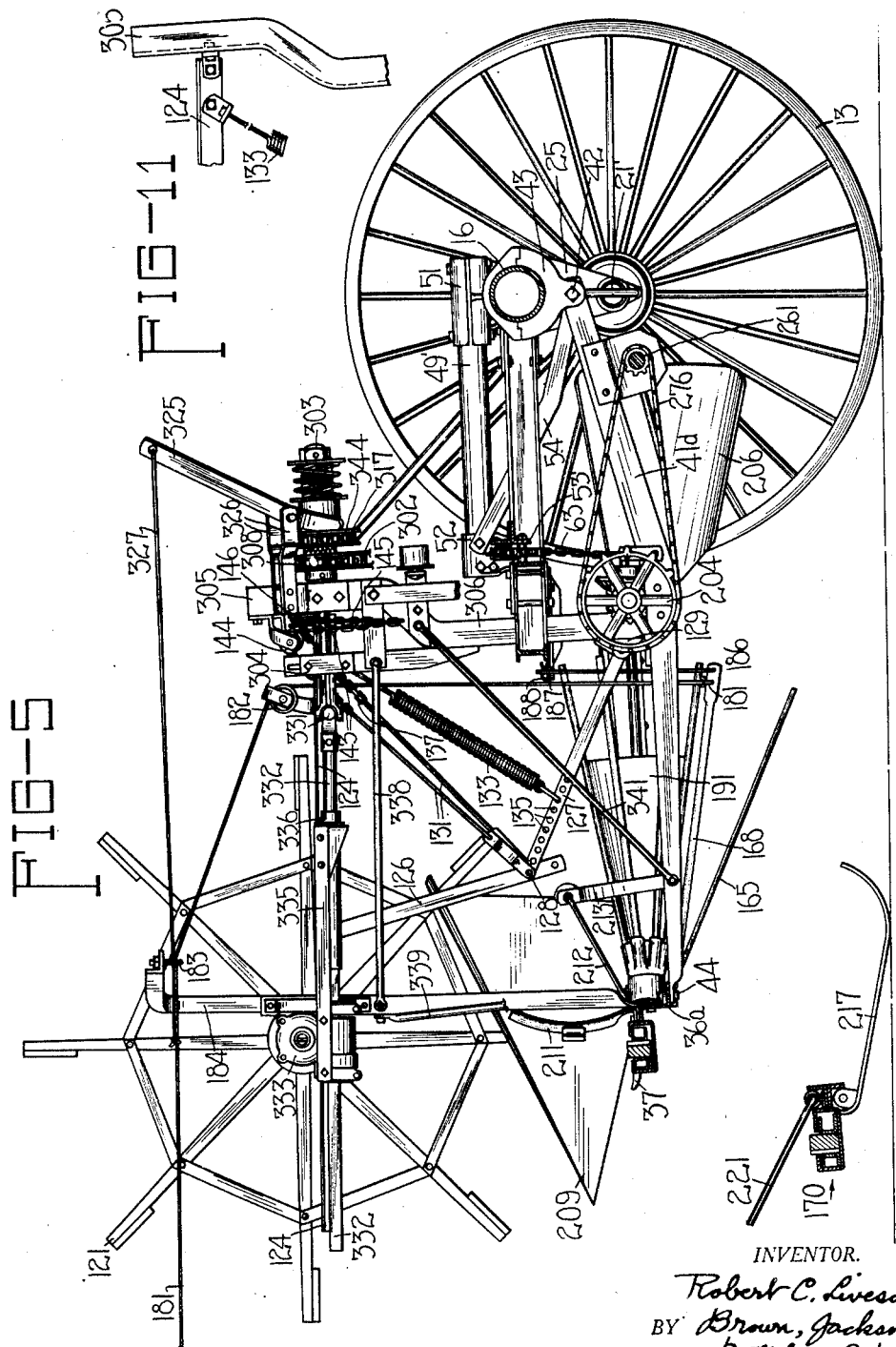

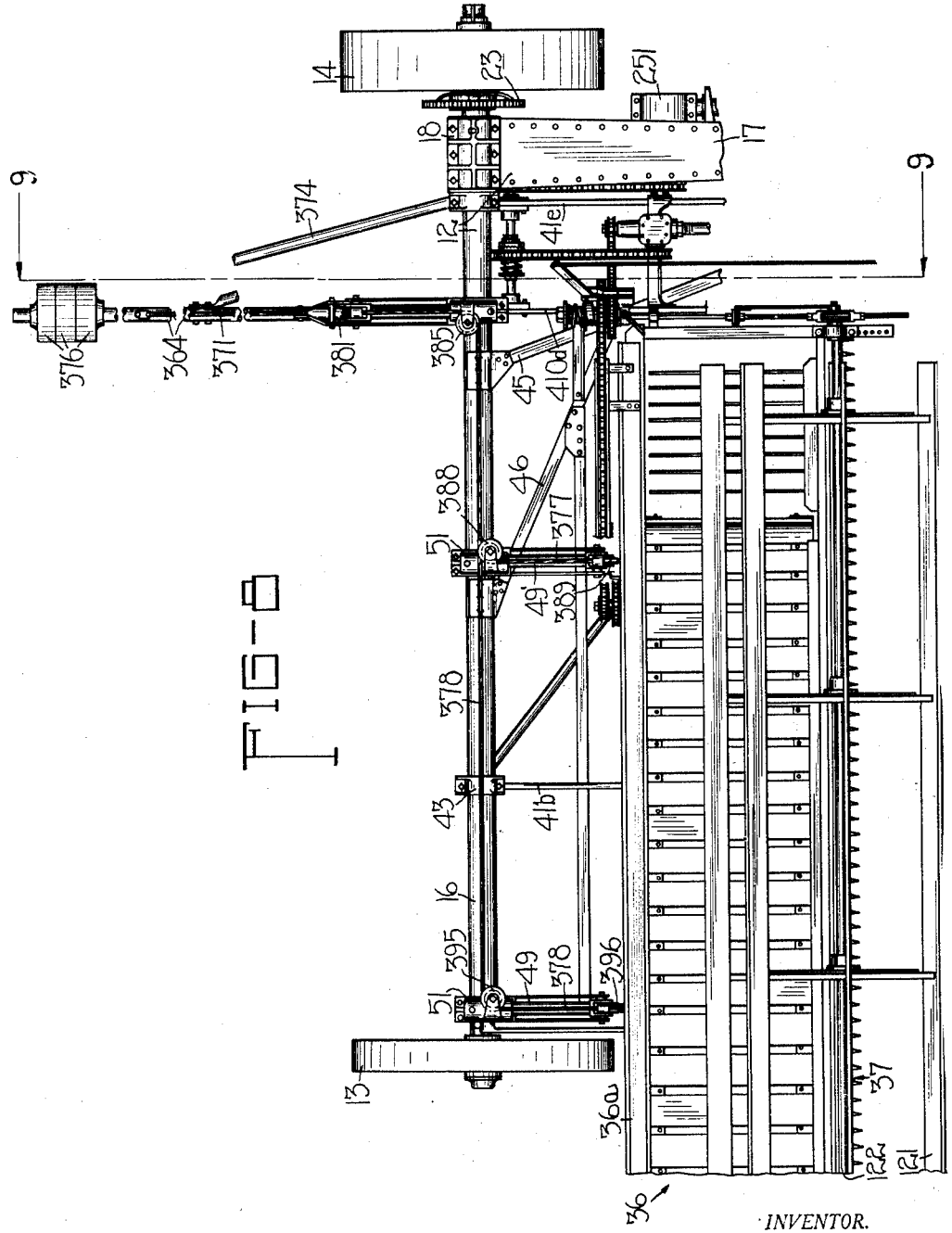

Patented Apr. 10, 1934

1,954,630

UNITED STATES PATENT OFFICE 1,954,630

HARVESTER

Robert C. Livesay, Moline, Ill., assignor to Deere & Company, Moline, Ill., a corporation of Illinois Application February 12, 1932, Serial No. 592,488

29 Claims. (Cl. 56—23)

The present invention relates to harvesters, and more particularly to windrow harvesters adapted to deposit the cut grain in windrows in the field. In certain sections of the country or under certain weather conditions, it is often desirable to cut the grain and to lay it in windrows where it can remain for a sufficient length of time to become properly cured, etc. Thereafter, a thresher may be drawn across the field, such thresher being provided with a pick-up attachment to pick up the cut grain from the windrows for delivery to the thresher, or the grain can be picked up by a rake and loader and deposited in a wagon for conveyance to a thresher or to a place of storage. The windrow of cut grain is deposited on the grain stubble and, in the practice of this method, it is important that the cut grain be deposited in these windrows in such manner that the air will properly circulate through the grain; that the grain will be better protected from contact with the ground; that the windrow may be protected from the wind; and that the grain may be easily picked up by a pick-up device.

The general object of the invention is to provide an improved apparatus and improved method for carrying out a windrow harvesting operation.

The windrow of grain is laid on a swath of stubble which is considerably narrower than the total harvesting swath of the harvester, and a further object of the invention is to provide improved means for producing this relatively narrower stubble swath on which the windrow of grain is laid.

Another object of the invention is to provide improved means for depositing the cut grain on this windrow swath of stubble.

Another object of the invention is to provide an improved construction and arrangement of rotary windrow forming device which prevents the windrow from spreading out and which weaves the loose grain ends into the body of the windrow.

Another object of the invention is to provide an improved construction and arrangement of mechanism, adapted primarily for operation when the implement is making a turn at the end of the field, which will function to raise the apparatus which deposits the cut grain on the windrow swath of stubble substantially simultaneously with the stopping of the transverse conveyor which carries the cut grain to said depositing apparatus, such raising of the grain depositing apparatus for the making of the turn substantially preventing the loss of the grain cut from any part of the entire swath.

A further object of the invention is to provide an improved construction and arrangement of cooperating parts in the harvester which will permit the harvester to be readily and easily separated into different units of smaller dimension, whereby the harvester can be conveniently arranged for transportation to and from the field and for travel through spaces of limited width.

Other objects and advantages of the invention will appear from the following detail description of a preferred embodiment thereof. In the accompanying drawings illustrating such embodiment:

Fig. 1 is a fragmentary plan view of one form of my invention, certain of the parts being broken away to better illustrate other details;

Fig. 2 is a side elevational view of this form of my invention;

Fig. 3 is a rear view, partly in section, corresponding to a section taken approximately on the plane of the line 3—3 of Fig. 1;

Fig. 4 is a fragmentary plan view on a larger scale, illustrating in greater detail the delivery opening, the apparatus for depositing the cut grain on the windrow swath in the stubble, the rotary windrow forming device, and several of the driving connections;

Fig. 5 is a fore and aft sectional view taken approximately on the plane of the line 5—5 of Fig. 1;

Fig. 6 is a sectional view taken longitudinally through the improved rotary windrow forming device;

Fig. 7 is a longitudinal sectional view through the automatic overload release mechanism and the manual release mechanism interposed in the driving train to the reel and to the platform conveyor;

Fig. 8 is a fragmentary plan view of a modified form of harvester employing a modified arrangement of counterbalancing means;

Fig. 9 is a fore and aft sectional view taken approximately on the plane of the line 9—9 of Fig. 8;

Fig. 10 is a fragmentary plan view on a larger scale showing details adjacent to the connection between the draft beam and transverse bar of the main frame of Fig. 1, and Fig. 11 is a detail view showing the upper connection of each reel counterbalancing spring.

Referring now to the form of construction illustrated in Figs. 1 to 7, inclusive, the harvester comprises a conventional harvester platform pivotally supported for vertical movement on a main frame structure 12. This frame structure 12 is mounted on two transversely spaced supporting wheels 13 and 14 and on a front truck assembly 15. Said main frame preferably comprises a transversely extending frame member 16, which in this instance consists of a tube or pipe, and a forwardly extending member 17 in the form of a draft beam, preferably consisting of upper and lower plates connected by two spaced longitudinally extending beams or webs. The transversely extending pipe member 16 is detachably secured to the top plate of the draft beam 17 by a split coupling 18 comprising two halves which are bolted together over the end of the pipe member and which are rigidly bolted to the draft beam. Referring to Fig. 3, the inner supporting wheel 14 is mounted on a stub axle 21, said stub axle being mounted below the draft beam 17 and secured thereto by a suitable casting 22 which is rigidly bolted to the draft beam. A sprocket wheel 23 is attached to the inner side of the wheel 14 for transmitting power to the implement parts, as will be hereinafter described. The outer supporting wheel 13 is mounted on a similar stub axle 21' which is disposed below the pipe member 16 and is fixed to said pipe member by a depending bracket 25 (see Fig. 5).

As previously mentioned, the front end of draft beam 17 is supported on a truck assembly 15 including a pair of laterally spaced wheels 27 mounted on a transverse axle 28. Secured to the center of the axle 28 is a supporting pedestal 29 (Fig. 2) in which is seated the lower end of a swivel arm 31, the upper end of this swivel arm being offset rearwardly and being journaled in a bearing sleeve 32 secured to the forward end of the draft beam 17. A hitch frame 33 is connected to the pedestal 29 and to the swivel arm 31, and this hitch frame is provided with any conventional draw bar 34 for attachment to the tractor or other pulling vehicle.

The harvester comprises a harvesting platform 36 having the conventional sickle bar 37 mounted transversely along the forward margin thereof. Running along the length of the platform is the usual conveyer 38 which receives the grain upon being cut by the sickle bar 37 and which transports the grain inwardly to a delivery opening which is generally indicated at 39. It is through this delivery opening 39 that the cut grain is deposited upon the windrow swath of stubble, as will be hereinafter described.

The harvesting platform 36 is pivotally supported on the transverse pipe member 16 on a plurality of forwardly extending arms 41a, 41b, 41c, 41d and 41e. A greater or less number of these arms may be employed, five being shown, and each arm has its rear end (Fig. 5) pivoted at 42 to an individual depending bracket 43 which embraces the pipe member 16. Each of these arms 41a–41e extends downwardly from the pivot axis 42 at a slight angle and then extends forwardly beneath the platform 36 to a point adjacent to the forward margin of the platform, where it is fastened by a bolt 44 to the front transverse bar 36a forming the front edge of the harvester platform frame 36. The rear transverse bar 36b of said platform frame may rest on the supporting arms 41a, 41b and 41c although it is preferably fastened to said arms.

The pipe member 16 and draft beam 17 are braced across the corner defined between these members by two diagonal brace bars 45 and 46. As shown in Fig. 1, the rear ends of these diagonal bars are fastened to brackets 45' and 46' rigidly secured to the pipe member 16. The front end of the brace 45 has detachable mounting on a pin 47 which is carried by a bracket plate 48 secured to the forward portion of the draft beam 17. This detachable connection at pin 47 is released when the pipe member 16 and harvester platform 36 are separated from the draft beam 17 preparatory to transporting the harvester to and from the field, as will be later described. The front end of the outer diagonal brace 46 is rigidly fastened to an intermediate part of the inner diagonal brace 45. These two diagonal braces assist in sustaining the draft load reacting rearwardly against the outer end of the harvester platform and against the outer wheel 13.

Two hanger arms 49 and 49', consisting of short sections of pipe, project forwardly from the transverse pipe beam 16, one of said hanger arms (Fig. 1) being disposed adjacent to the outer wheel 13 and the other hanger arm being disposed substantially midway between the wheels 13 and 14. The rear ends of said hanger arms are fastened in split sleeve brackets 51 which extend upwardly from the two brackets 43 on which the arms 41a and 41c are pivoted. The forward ends of the hanger arms 49, 49' have depending brackets 52 fastened thereto, and secured to the lower ends of these brackets is a supporting bar 53 (Fig. 3) extending substantially parallel to the harvester platform. Downwardly inclined brace bars 54 may be extended from the forward brackets 52 down to the pivot bolts 42 on which the arms 41a, 41c are pivoted. As shown in Fig. 1, the inner end of this transversely extending bar or rail 53 is joined to the diagonal corner brace 46 by an attaching plate 56. It will be seen that the hanger arms 49, 49' and the transverse rail 53 are rigidly joined to the transverse pipe member 16 and to the forwardly extending draft beam 17 so that the transverse rail 53 is a rigid part of the frame comprising the two main frame members 16 and 17. Flexible suspension members depend from this transverse rail 53 for operative attachment to the harvester platform, and it is through these flexible suspension members that the platform is counterbalanced.

Referring to Fig. 3, said suspension means comprisee three chains 61, 62 and 63 which are trained over sprocket wheels 64, 65 and 66 suitably carried by the transverse rail 53. The lower ends of each of these three chains are connected by links or clips 67 with the platform supporting arms, the chain 61 being connected with the arm 41a, the chain 62 being connected with the arm 41c and the chain 63 being connected with the arm 41d. The inner end of the outer chain 61 is connected to a rod 68 extending inwardly adjacent to the transverse rail 53. The second chain 62 is connected with a like inwardly extending rod 69. The inner end of the first rod 68 is operatively connected with the outer end of the second rod 69, as illustrated in Fig. 3. Each of these rods preferably has an adjustable turnbuckle 71 (Fig. 1) interposed therein for adjusting the effective length of the rod. The sprocket wheel 66 for the third chain 63 is suitably supported on a short rail 53' which is secured to the diagonal corner braces 45 and 46 and which constitutes in effect an extension of the rail 53. The inner end of this third chain 63 and the inner end of the second rod 69 are both operatively connected at 73 (Fig. 1) to a large chain 74 extending inwardly over the upper side of the draft beam 17 for operative detachable connection with a cam member 75. This cam member is of substantially triangular shape and is pivotally mounted at 76 beneath a U-shaped bracket 77 secured to the draft beam 17. There are two arcuate cam tracks, one above the other, formed in the periphery of this cam member 75, and the chain 74 is disposed in one of these cam tracks, being suitably fastened to the far end of the latter. Disposed in the other cam track is a chain 78 which extends forwardly for attachment through a suitable connecting clip 79 with a nest of parallel tension springs 81. The forward ends of said springs are connected through a like clip 79' with a screw threaded rod 82 passing through a bracket 83 stationarily mounted on the draft beam 17 and receiving a nut 84 on its front end engaging the front side of the bracket. Adjustment of the nut 84 is operative to vary the tension of the springs 81 to change their counterbalancing tension. The shapes of the two cam tracks of cam member 75 are such that as the tension of the nest of springs 81 changes the moment arms of the chains 74 and 78 change correspondingly with the result that the harvesting platform is substantially balanced in all of its positions of vertical adjustment. It will be evident from the foregoing description that the harvesting platform 36 is capable of swinging upwardly and downwardly about the transverse pivot axis defined by the pivot bolts 42 at the inner ends of the arms 41a–41e and that the aforementioned chains 61, 62 and 63 depending from the stationary frame bar 53 establish counterbalancing connections with various separated points of the harvesting platform whereby the platform is effectively counterbalanced in any of its vertically adjusted positions. The turnbuckles 71 provide separated individual adjustments for raising or lowering different portions of the harvester platform with relation to the counterbalancing mechanism.

In connection with this counterbalancing mechanism, it is one of the features of the present invention to provide means for avoiding the necessity of relieving the tension in the springs 81 when the harvester platform 36 is disconnected from the draft beam 17 for transport purposes. As illustrative of one preferred embodiment of such means, Fig. 10 illustrates a rod 86 having a hooked forward end 86' which is adapted to hook over the forward edge of the cam member 75, or over any suitable projection on this cam member, when it is desired to disconnect the harvester platform and its counterbalancing connections while still sustaining the counterbalancing tension in the nest of springs 81. The rear end of the rod 86 is pivotally connected at 87 to the split clamping bracket 18 so that the forward hook end 86' can be swung into and out of cooperative association with the cam member 75. A turnbuckle 88 is interposed in the length of the rod 86 for lengthening or shortening the rod. This rod is hooked to the cam member 75 to retain the tension of the springs 81 when the platform counterbalancing mechanism is disconnected preparatory to transport, as will be hereinafter described more in detail.

The platform 36 with its sickle 37 is adjusted vertically for different heights of cutting by the manual actuation of a control lever 91 (Fig. 2), which lever extends forwardly approximately above the draft beam 17 to have its operating end disposed in convenient proximity to the operator in his position on the seat of the tractor. This adjusting device 91 is a broken lever comprising two sections 92 and 93 which are angularly adjustable relatively to each other in order to dispose the forward end of the lever assembly at a convenient height for actuation. The rear end of said lever is pivotally mounted at 94 on a bracket 95 secured to the draft beam 17. The upper end of the rear lever section 92 has a slotted yoke bracket 96 secured thereto. The front section 93 of the lever extends through the slotted outer end of the yoke bracket 96 and is pivoted therein on the transverse pivot pin 97. A plurality of latching teeth 98 are formed in the arcuate inner end of the yoke bracket, and a retractable latching rod 99 is adapted to engage said teeth, this rod extending up through the front lever section 93, which is preferably tubular. A hand operated grip release lever 101 at the forward end of the lever section 93 is operatively connected with the latching rod 99 whereby this rod can be released from the teeth 98 through the grip release 101. Releasing of this latched engagement permits the outer lever section 93 to be oscillated about the pivot 97 in order to adjust the angle between the two broken lever sections for disposing the front end of the lever at a more convenient height for actuation from the tractor seat.

For locking the lever in its entirety at any desired cutting height of the harvester platform, there is provided on the side of the lower lever section 92 a latching dog 103 (Fig. 1) which is suitably spring pressed for engaging in any one of a series of holes formed in the side flange of an arcuate latching sector 104. This latch is released through a hand grip releasing lever 105 which is pivotally mounted on the side of the front lever section 93, adjacent to the front end thereof. A rod 106 extends from the hand grip lever 105 back to the latch member 103 and has any suitable operative connection therewith. For example, the latch rod 103 may be suitably guided for motion along the line of the lever section 92 and may have an eye at its forward end which links to an eye in the rod 106 substantially alongside the pivot axis 97 whereby the rod 106 will function to transmit retractive movement to the latch rod 103 irrespective of the angular relation between the two lever sections 92 and 93. The lower end of the latching sector 104 is bolted to the draft beam 17 (Fig. 2) and the upper end thereof is supported and braced by a triangular arrangement of brace rods 108 which have their lower ends suitably secured to the draft beam. The operating connection between this adjusting lever and the harvester platform is established through connections comprising a sleeve 111 secured to the rear lever section 92 and pivotally connected with a downwardly extending link 112. Referring to Fig. 4, the lower end of this link is pivotally connected at 114 to the forward end of the innermost platform supporting arm 41e. Thus, actuation of the adjusting lever 91 is operative to raise or lower the cutting height of the harvester platform, and the platform may be retained in any desired adjustment by the latching engagement at 103, 104. A turnbuckle 115 (Fig. 2) is preferably interposed in the link 112 to adjust the effective length of said link in order thereby to increase the effective range of adjustment of the harvester platform.

The usual reel 121 is mounted above the harvester platform 36, extending substantially the length of the sickle bar 37. The supporting shaft 122 on which the reel is assembled is journaled at its opposite ends on two forwardly extending arms 123 and 124 (Fig. 1), the rear ends of which arms are pivotally connected to uprights or standards adjacent to the rear edge of the harvester platform 36. As shown in Fig. 1, the outer ends of the supporting arms 123, 124 are provided with a series of bolting holes for receiving at different points along the lengths of said arms the journal blocks in which the reel shaft 122 is journaled, whereby the position of the reel can be shifted forwardly or backwardly along said arms and relatively to the sickle 37. In any of the aforesaid vertical adjustments of the platform 36 and sickle 37, effected through the adjusting lever 91, the reel 121 is raised and lowered correspondingly. Provision is also made for raising or lowering the reel relatively to any cutting adjustment which may have been given the harvester platform. This is accomplished through mechanism comprising pairs of toggle links disposed approximately below each reel supporting arm 123 and 124. Fig. 5 illustrates the toggle below the supporting arm 124, from which it will be seen that each toggle comprises two toggle links 126, 127 which are pivotally connected at a toggle joint 128. The upper toggle link 126 is pivotally connected with the forward portion of the reel supporting arm 124 (at a pivot point not shown), and the lower toggle link 127 is pivotally connected to a bracket 129 which is suitably secured to the harvester platform. A rod 131 is pivotally connected with each toggle, such as by a suitable clevis or link clip operatively pivoted to the toggle at the toggle pivot 128 or at any other desired point, and the upper end of this rod 131 is linked to a chain which I shall presently describe. A tension spring 133 has its upper end suitably fastened to a bracket carried by the reel supporting arm 124, see Fig. 11, and the lower end of this spring is adapted to be coupled to any one of a series of holes 135 formed along the toggle link 127. The arrangement of the toggle links 126, 127 and tension spring 133 at the outer reel supporting arm 123 is substantially a duplication of the arrangement just described under the inner reel supporting arm 124. This construction provides a counterbalancing arrangement wherein the counterbalancing forces are always substantially uniform in the different vertically adjusted positions of the reel relatively to the harvester platform. Such follows from the fact that as the toggle pivot 128 of each toggle assembly moves nearer its dead center relation the force necessary to move this toggle pivot in this direction obviously becomes less, and this decreasing force is in approximately the same proportion that the degree of tension in each spring 133 becomes less due to its contraction, and, of course, the same relationship between increasing force and increasing tension holds true in the outward movement of the toggle pivot 128 away from its dead center relation. The connection of the upper end of each spring 133 with a part which moves correspondingly to the adjustment of the reel, i. e. its connection with the reel supporting arm 124, also aids in securing a substantially uniform counterbalancing effect. By virtue of this point of connection, as the reel is raised or lowered, the upper end of said spring is moved correspondingly a certain amount, depending on the distance of said point of connection from the pivot point around which the reel supporting arm swings. This movement of the upper end of the spring prevents the spring from offering too much resistance against movement of the reel in its lower range of adjustment, and also gives the spring additional advantage in the higher ranger of adjustment of the reel, all aiding in securing a substantially uniform counterbalancing force throughout the entire range of adjustment of the reel. The springs 133 may be operatively connected to different holes 135 along the links 127 to vary the counterbalancing effect of said springs.

Referring now to the mechanism for manually adjusting the height of the reel relatively to the harvester platform, there is illustrated in Fig. 5 the two rods 131 extending upwardly and rearwardly from the respective toggles under the two reels supporting arms 123, 124. The rod 131 of the outer toggle is connected to a chain 137 (Figs. 1 and 3) which is trained over a pulley 138 which is supported at the upper outer corner of the back windboard 140 of the harvester platform. The end of this chain is connected to a rod 139 which is guided for sliding movement in clips 141 supported on the upper frame bar of the windboard. The rod 131 of the inner toggle is connected to a chain 143 (Figs. 2 and 5) which is trained over a sheave 144 also mounted on the windboard frame or on any suitable upright 305 carried by the harvester frame. The inner end of the rod 139 has a chain 145 connected thereto which passes down around a sheave 146 (Fig. 5) suitably supported adjacent to the sheave 144, and the two chains 143 and 145 are connected to a single chain 147 (Fig. 1) which extends around a sheave 148 mounted on the harvester platform frame. Said latter chain is connected through link 149 (Fig. 10) with a chain 151 which passes around a sheave 152 suitably supported on the adjacent clamping bracket 43 mounted on transverse pipe member 16. The chain 151 thence extends forwardly from the sheave 152 and is connected with a rod 153 which extends forwardly to an adjusting lever 154. Referring to Fig. 2, said lever 154 is pivotally mounted on a supporting bracket 156 provided with a conventional latching sector 157 to which the lever 154 may be latched in any adjusted position. Said lever comprises a downwardly extending arm 154' to the lower end of which the rod 153 is connected, and it will hence be seen that by rocking the lever 154 the rod 153 is moved either forwardly or rearwardly for adjusting the height of the reel through the connections 151, 149, 147, 145, 143, 141, 137 and the two rods 131.

The chain 151 is an element in the train of parts through which adjusting motion is transmitted to the reel and one of the objects in passing this chain 151 back around the rearwardly disposed sheave 152 is to position this element of the train of parts in proximity to the pivot axis 42 about which the harvester platform raises and lowers. By this arrangement the act of raising or lowering the harvester platform will not appreciably change the position of the reel with respect to the platform, the reel moving upwardly and downwardly therewith concurrently with the adjustment of the platform. The reel adjusting lever 154 is positioned where it can be conveniently actuated by the operator from his position on the tractor.

When disconnecting the harvester platform from the draft beam 17 for transport this train of parts for adjusting the reel is preferably interrupted at the chain 151. Either the inner or outer run of chain (on either side of the sheave 152), or the rear end of the rod 149, is provided with a hook 150 (Fig. 10). By squeezing the two runs of the chain together this hook can be hooked to one of the links of the other run of the chain, thereby locking the loop of chain to sheave 152, which is carried by the harvester platform through its attachment to bracket 43. The rod 153 can then be unhooked from the chain 151, to permit separation of the draft beam from the platform, without allowing the reel to drop.

Referring now to the mechanism for delivering the cut grain to the windrow swath of stubble, as I have previously described, the conveyor 38 carries the cut grain to a delivery zone defined by the opening 39 which is disposed on the grainward side of the draft beam 17 and supporting wheel 14. Preferably, the main sickle 37 and the reel 121 extend across approximately the entire width of this delivery opening 39, with the conveyor belt 38 only extending up to approximately the edge of this opening and then traveling back along the underside of the harvester platform. As best shown in Figs. 1 and 4, there is disposed in this delivery opening 39 a series of grain supporting and directing fingers or rods 165 which have their front ends anchored in a transverse rock shaft 166 and which have their rear ends free to swing up and down relatively to the delivery opening. Said shaft extends across the front edge of the opening and is journaled in bearings 167, and is provided with a rearwardly extending actuating arm 168 through which the shaft and fingers 165 are rocked to control the discharge of grain through the opening. Referring to Fig. 3, the windboard 140 along the back of the harvester platform is cut away around the delivery opening 39 to provide a relatively large unobstructed space through which the grain can be delivered. Disposed in front of the delivery opening is an auxiliary sickle bar 170 which is preferably disposed at a relatively low height for the purpose of cutting the grain stalks at such a height above the ground that the swath of stubble cut by this auxiliary sickle 170 will be stiff enough to support the grain being deposited thereon through the delivery opening 39. In the preferred construction and adjustment of the parts, the fingers 165 are normally inclined downwardly and rearwardly at an angle which will gradually deflect or lower the grain upon this swath of short, stiff stubble, so as to break the fall of the grain and prevent it from mashing or breaking down this swath of stubble. In this preferred relation, the fingers 165 are positioned with their lower ends slightly above the top of this stubble, but irrespective of their position the fingers themselves will not tend to mash or break down this windrow supporting swath of stubble. That is to say, the fingers form in effect a grain depositing device of openwork formation which may, if desired, be lowered to dispose the lower finger-like edge of said device substantially in the stubble without bending or breaking the stalks, which merely slip around the fingers. While I regard the previously described arrangement as being preferable, it is of course within the scope of my invention either to normally incline said fingers at a different angle, or to vary the spacing and slopes of the different fingers for different grain distributing effects, or to change the shape of these fingers, or to employ other grain depositing means than this particular arrangement of fingers.

In making a turn at the end or corner of the field it is preferable to rock the fingers upwardly to a horizontal or upwardly inclined position for temporarily interrupting the depositing of the grain until after the turn has been completed, and particularly for interrupting the depositing of that portion of the grain cut directly in front of the delivery opening 39. This is accomplished through a cable 181 which is connected to the rear end of the rock shaft arm 168. This cable extends upwardly over a pulley 182 suitably carried by the harvester platform and thence forwardly through a guide eye 183 mounted on a standard 184 also supported on the harvester platform. The cable then extends forwardly to a suitable point of attachment on the tractor adjacent to the operator's seat, whereby upon pulling this cable the operator can raise the grain depositing fingers 165 up to a horizontal or upwardly inclined position when the implement is being turned at the corner of the field for preventing loss of grain. A clutch releasing connection is also established with this cable so that when said fingers are raised to a non-depositing position the transmission of power to the conveyor 38 will also be interrupted, as I shall hereinafter describe. As best shown in Fig. 5, a rod 186 is also connected to the outer end of the rock shaft crank arm 168 and this rod passes through an apertured bracket 187 suitably supported on the frame of the harvester platform and is provided with a stop pin 188 adapted to engage the bracket 187 for limiting the lowered position of the depositing fingers 165. If desired, the stop pin 188 may be arranged for adjustable mounting at different points along the length of the rod 186 for adjustably limiting the downwardly inclined position of the fingers.

Referring to Fig. 4, there is provided at the inner side of the delivery opening 39 a rotary windrow forming device 191 which confines the windrow by preventing outward spreading thereof and which also weaves the loose grain ends into the body of the windrow. This device is preferably of conical or umbrella-like shape, comprising a sheet metal cone 192 around which at spaced intervals are fixed a plurality of fingers or rods 193 radiating outwardly in conical relation. Referring to Fig. 6, the sheet metal cone and the fingers are secured at their converged ends in a cap 194, which has a forwardly extending cylindrical portion journaled for rotation in a bearing sleeve 195 which is bolted to the front frame bar 36a of the harvester platform. Rotation is transmitted to said windrow forming device through a shaft 197 which extends longitudinally of the harvester and enters the open rear end of the sheet metal cone, where it is provided with a universal joint 198 operatively connected with a stub shaft 199 anchored in the inner end of the cone. The rear end of said shaft is journaled in the offset bearing arm 201' (Fig. 4) of a bearing bracket 201 which is bolted to the platform supporting arm 41d. A bevel gear 202 on this end of the shaft 197 meshes with a bevel pinion 203 mounted on a stub shaft journaled in the bearing bracket 201. A sprocket wheel 204 on the inner end of this stub shaft receives power through driving connections which I shall hereinafter describe. The windrow forming device is preferably rotated in a direction such as will revolve the flared rods 193 downwardly towards the grain depositing fingers 165 (clockwise as viewed in Fig. 3), so that the grain at this side of the delivery opening is forced into the body of the windrow to form a compact windrow and to prevent spreading, and so that the loose grain ends are woven into the body of the windrow. It will also be observed that the axis of said windrow forming device is set at an angle whereby this angle together with the conical flare of the fingers 193 causes said fingers to engage the loose grain ends for weaving them back into the body of the windrow. With such positioning and formation of the windrow forming device 191, the adjacent grain delivering fingers 165 are cut off at varying lengths to clear the windrow forming device, although it will be understood that such arrangement is not essential. The opposite edge of the windrow is prevented from spreading by the provision of a deflecting shield 206 which is suitably supported on the rear frame bar 36b of the harvester platform. As shown in Fig. 4, this shield is inclined inwardly so as to prevent spreading of this edge of the windrow and so as to cooperate with the rotary windrow forming device 191 in forming a compact windrow.

Grain dividers 208 and 209 are provided on the harvester platform 36 at the grainward and at the stubbleward ends, respectively, of the main sickle bar 37. The divider 208 is mounted on the grainward end of the harvester platform in any suitable manner, and the divider 209 is mounted on the stubbleward end of the platform by a bracket 211 which is bolted to the front frame bar 36a of the harvester platform, see Fig. 5. As shown in this figure, the divider 209 is of pointed formation and is curved (Fig. 1) so as to direct the falling grain cut by the adjacent ends of the main and auxiliary sickle bars 37 and 170, respectively, in a direction which will cause this grain to be properly acted upon by the downwardly revolving fingers of the rotary windrow forming device 191. The rear edge of the divider 209 may be further braced by the rod 212 and arcuate strap 213 extending from the platform frame bar and from the platform supporting arm 41d and attached to the rear portion of the divider.

Referring now to the auxiliary sickle 170 which cuts the windrow supporting swath of stubble, this sickle bar is supported independently of the harvester platform so that said platform can be raised or lowered without changing the cutting height of the auxiliary sickle bar. This cutting height of the auxiliary sickle bar is relatively low so as to produce a swath of short, stiff stubble for supporting the windrow of grain discharged through the opening 39. Said auxiliary sickle is supported on a frame bar 216 which at its outer end is supported on a runner 217 (Fig. 3) adapted to slide along the ground. The inner end of said bar is suitably connected to the draft beam 17 by connections including the inclined brace bar 218 and bracket 219. The mounting of the sickle is reinforced against draft pull by a brace rod 221 which is connected to the sickle supporting bar 216 at a point intermediate its ends (Fig. 3) and which extends upwardly and forwardly for attachment to the underside of the draft beam 17 (Fig. 2). A turnbuckle 222 in said draft rod enables the proper tension and adjustment to be maintained in the rod. Referring to Fig. 4, the cutter bar of the main sickle 37 is driven from a shaft 225 which has bearing support at its front end in a bearing 226 mounted on the front frame bar 36a of the harvester platform. A crank wheel 227 on the front end of said shaft actuates a pitman 228 which is connected through the slide block 229 with the cutter bar of the main sickle. The cutter bar of the auxiliary sickle 170 is driven from a shaft 231 which has bearing support at its front end in a bearing 232 carried by the supporting bar structure of the auxiliary sickle. A crank wheel 233 on the front end of the shaft 231 is operatively connected through a pitman 234 and a slide block 235 with the cutter bar of said auxiliary sickle. Said auxiliary sickle is spaced forwardly from the main sickle, and it will also be noted from the foregoing that the drive shaft 225 and pitman 228 of the main sickle are disposed within the space circumscribed by the drive shaft 231 and pitman 234 of the auxiliary sickle, whereby the harvester platform and its main sickle can be tilted downwardly to a relatively low cutting height without interference between the sickles and their driving connections. The construction permits the main sickle 37 to be lowered, if desired, approximately to the same cutting height as the auxiliary sickle 170. The latter sickle may also be arranged for vertical adjustment relatively to its mounting on the draft beam 17 and relatively to its runner 217.

It will be noted that by the present arrangement of the two sickles practically all of the grain stalks in the line of the windrow supporting swath are cut twice at different heights whereby the intervening spans of stalks between the two points of cutting are dropped down on the short stubble to aid in forming a bed for the windrow. That is to say, the auxiliary sickle 170 cuts the stalks at a relatively low height to leave a short, stiff stubble in the field, and then the stalks in coming into engagement with the upper main sickle 37 are cut at a higher height, the heads above this point of cutting falling inwardly through the discharge opening 39 and the intervening lengths of stalks between the two heights of cutting falling downwardly between the sickles upon the swath of short, stiff stubble.

Referring now to the different driving mechanisms for transmitting power to the different parts of the implement, I shall first describe how power is transmitted from a typical power take-off device on the tractor to said driving mechanisms, and shall then describe how power may be derived from the bull wheel 14 of the implement, one type of drive being readily convertible into the other. As shown in Figs. 1 and 2, the power take-off device on the tractor is adapted to be connected with a shaft 241 which is operatively connected through a double form of universal joint 242 with a shaft 243 inclined outwardly and downwardly along the side of the draft beam. The forward portion of the shaft 243 is journaled in a bearing bracket 244 mounted on the draft beam. The rear end of said shaft 243 is operatively connected through a universal joint 246 with a shaft 247 disposed alongside of the draft beam. The shaft 247 is journaled adjacent to its front and rear ends in bearing brackets 248 and 249 projecting laterally from the side of the beam. At its rear end said shaft enters a gear enclosure 251 where it supports a bevel pinion 252 (Fig. 4) meshing with a bevel gear 253. Said latter gear is mounted on one end of a transverse shaft 254 which has bearing support in laterally spaced bracket plates 255 projecting downwardly from opposite sides of the draft beam 17. On the inner end of the transverse shaft 254 is a sprocket 257 over which passes a chain 258 extending back and passing around a sprocket 259. The latter is mounted on a transverse jack shaft 261, which functions as the main power distributing shaft from which a series of drives are taken to different mechanisms. Said jack shaft 261 is journaled in depending bearing brackets 262 and 263 which are secured in depending relation to the two innermost platform supporting arms 41d and 41e. Thus the jack shaft rises and falls with the raising and lowering adjustments of the harvester platform, but it will be noted that said jack shaft is positioned in close proximity to the transverse pivot axis 42 around which the platform swings and hence the very slight up and down movement of said jack shaft does not interfere with the transmission of power through the chain 258 from the stationarily mounted sprocket wheel 257.

Keyed to the inner end of said jack shaft is a sprocket wheel 265 over which a chain 266 passes and extends forwardly to a sprocket wheel 267 mounted on a transverse shaft 268. The latter shaft is journaled in a gear housing 271 and the shaft and housing are supported between the lower ends of the bracket plates 255 which depend from opposite sides of the draft beam 17. Enclosed in the housing 271 is a conventional pair of bevel gears which transmit power from the shaft 268 to the forwardly extending shaft 231 which drives the cutter bar of the auxiliary sickle 170. If desired, the gear housing 271 and shaft 231 may be arranged for vertical oscillation between the bracket plates 255 about the axis of the transverse shaft 268 to accommodate any vertical adjustment which might be given the auxiliary sickle 170 relatively to the draft beam 17.

It is opportune to reiterate here that the shafts 254, 268 and their sprocket wheels 257 and 267 are carried by the draft beam 17 and that the jack shaft 261 and its two sprocket wheels 259, 265 are carried by the harvester platform and its mounting arms; and that when the harvester platform and associated parts are disconnected from the draft beam for transport purposes (to be later described) it is only necessary to remove the two sprocket chains 258, 266 in order to effect a complete separation of all driving connections between the parts on the draft beam and the parts on the harvester platform.

Adjacent to the other end of the power distributing shaft 261 is a sprocket wheel 275 over which travels a chain 276 extending forwardly to the sprocket wheel 204. Thus, this chain transmits power through said sprocket wheel 204 and through the bevel gears 203, 202 and shaft 197 to the rotary windrow forming device 191. Since all of the parts for transmitting power to this windrow forming device are mounted on the harvester frame supporting arms 41d and 41e this windrow forming device can move directly with the harvester platform in the vertical adjustments of the latter without in any manner interfering with the transmission of power to said windrow forming device.

Mounted on an intermediate portion of said jack shaft 261 is a sprocket wheel 281 which is adapted to transmit power to the cutter bar of the main sickle and to the platform conveyor 38. This sprocket wheel 281 is rotatably mounted on the shaft 261 and is driven therefrom through an overload release clutch 282'. The overload torque at which such clutch releases is determined by a compression spring 283 which can be adjusted to a greater or less pressure by a collar 284 having adjustable threaded coaction with a screw thread on the jack shaft. The chain 286 passing over the sprocket wheel 281 extends forwardly to a sprocket wheel 287, and engaging the span of chain intermediate these sprocket wheels is an adjustable idler sprocket 289 mounted on a swinging arm 291 which is pivotally mounted on an extension portion 292 of a gear housing 296. Said arm 291 may be spring pressed into chain tightening position or it may be arranged for mechanical adjustment in any preferred manner. The extension portion 292 is joined to the gear housing 296 by a lower arm, not shown, and a brace rod 293 connected with said extension portion braces the gear housing. The sprocket wheel 287 and collar 292 are mounted on a transverse shaft 295 which is journaled in the gear housing 296. This housing is mounted on an arched bracket 297 spanning the two platform supporting arms 41d and 41e and secured thereto. The shaft 225 which drives the cutter bar of the main sickle 37 extends forwardly from the housing 296, and projecting rearwardly from said housing is either an extension of this same shaft or a separate stub shaft, designated 225', on which is keyed a sprocket wheel 301. A suitable pair or set of bevel gears in the housing 296 transmits power from the shaft 295 to the forwardly and rearwardly extending shaft portions 225 and 225'.

The sprocket wheel 301 transmits power to the platform conveyor 38 and to the reel 121 through a chain 302 which extends from said sprocket upwardly to a superposed transmission shaft 303 disposed longitudinally relatively to the implement. The latter shaft is journaled in suitable bearings mounted on longitudinally spaced arms 304 and 305 projecting from the upper part of a standard 306 rising from the frame of the harvester platform. The chain 302 travels over a sprocket wheel 308 which is rotatably and slidably mounted on this shaft. Pinned to said shaft forward of the sprocket wheel is a collar 309 which is adapted to have an overload slippage connection with the sprocket wheel through cooperating serrations or teeth 311 formed in the adjacent faces of the collar and of the sprocket wheel hub. The forward end of the shaft 303 is operatively connected to drive the reel 121 through mechanism which I shall later describe, and this power is transmitted through the overload release connection established between the sprocket wheel 308 and the collar 309. A sleeve 314 slidably mounted on the shaft 303 has its forward end bearing against the hub of the sprocket wheel 308, and the rear end of said sleeve receives the pressure of a compression spring 315 which normally holds the toothed hub of the sprocket wheel 308 pressed against the toothed face of the collar 309 under a constant pressure. This end of the shaft 303 is threaded and a nut 316 adjustably mounted thereon enables the compression of the spring 315 to be adjusted. Rotatably and slidably mounted on the sleeve 314 is a second sprocket wheel 317. The adjacent end faces of the hubs of the two sprocket wheels 308 and 317 are also formed with a series of cooperating serrations or jaw clutch teeth 318 which normally transmit a drive from the wheel 308 to the wheel 317. A compression spring 321 bears against the other end of the hub 317' of the sprocket wheel 317 and the rear end of said spring abuts a flange 316' on the nut 316, this spring normally holding the clutch teeth 318 in yielding engagement for transmitting a drive from the wheel 308 to the wheel 317. The hub 317' is provided with a counterbore 322 for accommodating the flange 314' on the sleeve 314, against which flange the inner compression spring 315 bears. An annular groove 324 is formed in this end of the hub 317' for receiving the forked end of a clutch releasing lever 325 (Fig. 5). This lever is pivotally mounted between the arms of a yoke shaped bracket 326 which is secured to the arm 305 of the standard 306. A cable 327 extends from the clutch releasing lever 325 and is connected with the cable 181 which extends forwardly to the operator's position on the tractor. It will be recalled that forward pulling on the cable 181 serves to elevate the grain delivery fingers 165 up to a substantially horizontal or upwardly inclined position in the delivery opening 39, for interrupting the delivery of grain down upon the stubble, and inasmuch as the cable 327 is connected to the cable 181 such pulling of the latter cable will also actuate the lever 325 to slide the sprocket wheel 317 rearwardly to disengage the clutch teeth 318 and thereby interrupt the drive to the sprocket wheel 317. As will be later described, this sprocket wheel transmits power to the harvester platform conveyor 38, and hence the interruption of power to the sprocket wheel stops the motion of the conveyor substantially at the same time that the grain delivery fingers 165 are elevated, such occurring when the implement is being turned at the end of the field.

Referring now to the mechanism for transmitting a drive to the reel 121, it will be seen from Fig. 5 that the shaft 303 is connected to a universal joint 331 just beyond the bearing arm 304 and that this universal joint is connected with a shaft 332. The rear portion of said shaft is of cylindrical form and the forward portion is of square or polygonal cross section. The latter portion of the shaft extends through a worm gear housing 333 in which are disposed a worm and a worm wheel, the square or polygonal portion of the shaft 332 sliding axially through a correspondingly shaped bore in the worm whereby the housing and worm can be shifted longitudinally along the length of the shaft 332 while still maintaining the driving relation between the shaft and worm. The worm wheel is operatively connected with the adjacent end of the reel supporting shaft 122. As previously described, the end bearings for the reel shaft 122 are shiftable inwardly and outwardly to different points along the reel supporting arms 123, 124 for adjustably disposing the reel inwardly or outwardly relatively to the main sickle 37 and to the auxiliary sickle 170, and in such adjustment the worm housing 333 moves correspondingly along the polygonal section of the shaft 332. A reinforcing and torque sustaining bracket arm 335 has its front end fixedly secured to the worm gear housing 333 and has its rear end secured to a bearing 336 which is slidable along the cylindrical portion of the shaft 332. It will be understood that the vertical adjustments of the reel effected through the toggle links 126, 127 are accommodated by the universal joint 331 and by the ability of the outer end of the shaft 332 to slide longitudinally in the worm gear casing 333.

The standard 184, on the upper end of which the guide eye 183 is supported for the cables 181 and 327, is braced by a longitudinally extending brace rod 338 extending back to the arm 304 of standard 306, and by a diagonally extending brace rod 339 extending down to the front frame bar 36a of the harvester platform. If desired, a suitable guided relation may be established between the reel supporting arm 124 and the standard 184 whereby the reel supporting arm is braced laterally in any of its vertically adjusted positions. A brace rod 341 may also be extended between the upper portion of the standard 306 and a forward portion of the platform supporting arm 41d.

Referring now to the mechanism for driving the platform conveyor 38 from the sprocket wheel 317, it will be seen from Fig. 3 that a chain 344 travels over this sprocket wheel and extends out to a sprocket wheel 345 having suitable bearing support on the back of the windboard 140. Cooperating with both runs of the chain 344 are guides or guards 346, and engaging with the lower run of the chain to adjustably tension the chain is an idler sprocket 347. The outer sprocket wheel 345 drives a companion sprocket wheel 348, and trained over the latter is a chain 349. The latter extends downwardly and travels around a sprocket wheel 351 which is secured to a shaft 352 suitably journaled on the lower rear portion of the harvester platform frame. Said shaft 352 extends into a chain housing 353 where it carries a sprocket wheel (not shown) driving a chain which passes over a sprocket wheel which is keyed to the conveyor drive shaft 354. Said conveyor drive shaft drives the end roller or wheels around which the conveyor 38 travels in passing downwardly and backwardly adjacent to the delivery opening 39.

It will be apparent from the foregoing that the overload release clutch 311 established between the sprocket wheel 308 (Fig. 7) and the collar 309 prevents any damage to the parts in the event that the reel should strike an obstruction or develop an overload torque for any other reason, or in the event that the conveyor 38 should become jammed or develops an overload torque. Also, the clutch 318 between the two sprocket wheels 308 and 317 is released through the shifting lever 325, substantially simultaneously with the lifting of the delivery fingers 165 to non-delivering position, to thereby stop the conveyor 38 at this time and prevent the discharge of grain when the implement is being turned at the end of the field.

The conversion of the implement to one of the type wherein all of the operating parts are driven by traction power can be effected without disturbing or modifying any of the above described driving relations to the different implement parts. Referring to Fig. 4, it is only necessary to remove the bevel pinion 252 and the bevel gear 253 and to mount a sprocket wheel on the shaft 254 in the space thus provided by the removal of these bevel gears, and to then extend a chain from the bull wheel sprocket 23 to this sprocket on the shaft 254. Thereupon, all power for driving the different operating parts on the implement is derived from the traction energy of the bull wheel 14. In some instances it is preferred to drive the implement parts from the traction power of this wheel because it reduces the side draft incident to the drag of the sickle 37 and outer wheel 13, by adding to the load on the side of the draft beam 17 opposite to the sickle and outer wheel.

The general operation of the implement and of each of the several parts will be evident from the foregoing description, and I shall now describe the manner of dismantling the implement into two or more parts for transporting the same from one location to another. Because of the wide span of the harvester platform 36 it is desirable to disconnect this structure from the draft beam 17 so that the platform can be transported (on a special transporting truck or chassis) in a direction along the length of the platform and reel. The pipe frame member 16 and all of the supporting arms 41a—41e remain a part of the harvester platform assembly when disconnected from the draft beam for transportation. A special transporting truck (not shown), having a jack at one side thereof, is wheeled under the platform, with the jack disposed beneath the pipe 16, whereupon the jack is operated to lift all weight from the wheel 13. This wheel is then removed and the platform is then lowered down upon the truck. A second jack is then placed under the rear end of draft beam 17 adjacent to the split coupling 18. The top section of this coupling is removed to permit disconnection of the pipe 16 therefrom, and the front end of the diagonal corner brace 45 is separated from the attaching pin 47 on the bracket plate 48. The harvester platform is disconnected from the raising and lowering lever 91 either by disconnecting the depending link 112 from its attachment 114 to the platform or by separating the link at the turn-buckle 115, the lever 91 and its latching quadrant 104 remaining on the draft beam 17. In disconnecting the platform counterbalancing mechanism the hooked rod 86 is hooked to the cam member 75 and the latter held thereby in any desired position to maintain the tension of the springs 81, the turnbuckle 88 in the rod 86 enabling the cam member 75 to be oscillated forwardly or rearwardly. The counterbalancing chain 74 is then disconnected from the cam member. In disconnecting the mechanism for adjustably raising and lowering the reel 121, the two sides of the loop of chain 151 passing around sheave 152 are first hooked together. This is accomplished, as previously described, by squeezing the two sides of the chain loop together and engaging the hook 150 fastened to one run of the chain, to one of the links of the other run of the chain, thereby locking the chain to the sheave 152. Thereupon, by rocking the lever 154 downwardly slack is placed on the rod 153 and this rod can then be unhooked from the chain 151. The drive chains 258 and 266 are also removed to disconnect the train of driving parts between the draft beam and the harvester platform. The platform and the pipe 16 and all mechanism mounted thereon may then be backed away from the draft beam 17.

A short section of pipe of approximately the diameter of the pipe member 16, but only slightly longer than the width of the draft beam 17, is then placed between the halves of the split coupling 18 and is bolted in place. This short pipe section has a stub axle at its inner end, and the wheel 13, removed from the outer stub axle 21', is placed on the stub axle of this short pipe section. The secondary jack is then removed from beneath the draft beam 17, whereupon it is supported on the two wheels 13 and 14 and on the front truck 15. The special transport truck carrying the harvester platform and assembled parts is then hooked into the draft eye 361 (Fig. 1) projecting rearwardly from the draft beam 17, whereby this truck and the harvester platform are then trailed in back of the draft beam 17.

Figs. 8 and 9 illustrate a modified form of my invention, differing principally from the preceding form in the provision of weighted counterbalancing mechanism for counterbalancing the harvester platform. In this arrangement the harvester platform is tiltably connected with the pipe member 16 through the series of rearwardly extending platform arms 41$a$, 41$b$, 41$c$, etc., which are substantially the same as correspondingly numbered arms of the previous form, with the exception of the platform arm 41$d$, which I have designated 410$d$ in the modified construction. As shown in Fig. 9, this arm 410$d$ extends back beyond the pivot axis 42 to form the rearwardly and downwardly inclined arm portion 410$d'$. A long counterbalancing weight bar 364, preferably in the form of a pipe, is suspended below this platform arm 410$d$ to extend rearwardly therefrom. Clevis sleeves 365 and 366 are secured to the bar 364 and have upwardly extending clevis lugs which are pivoted or bolted at 367 and 368 to the forwardly and rearwardly extending portions of the arm 410$d$. A strut 369 extends upwardly from the weight bar 364 and bears against the underside of the arched portion of the arm 410$d$ to reinforce the connection between said arm and the weight bar. A tension truss 371 extends in an arched span between the front and rear portions of the weight bar, having its intermediate portion supported on a strut 372. A diagonal brace rod 374 (Fig. 8) extends from the rear portion of the brace rod laterally and inwardly to a point of pivotal connection with the pipe member 16 or with the draft beam 17. A plurality of weights 376 are adjustably secured on the rear end of the weight bar.

It will be evident that the platform supporting arm 410$d$ and the weight bar 364 operate in effect as a single member and that the counterbalancing force of the weight bar is transmitted to the inner or stubbleward end of the harvester platform directly through the arm 410$d$. The outer portion of the harvester platform would sag if only this inner end were counterbalanced through the arm 410$d$, and accordingly the invention includes a novel arrangement of flexible connections, such as chains or cables, for transmitting the counterbalancing force of the weight arm to different outwardly disposed points of the harvester platform. These flexible counterbalancing connections comprise two cables 377 and 378 which have their rear ends fastened to arm portion 410$d'$ at the point of attachment designated 379. These cables extend upwardly from said point of attachment and pass over two adjacent single sheaves or a double sheave indicated at 381, such sheave arrangement being mounted on the outer end of an arm 382 which projects from a tubular bracket 383 rigidly fastened to the pipe member 16. A brace bar 384 extends from the pivot axis 42 to the outer end of the arm 382 for bracing the latter. The two cables are extended forwardly above said arm to a pair of horizontal sheaves 385 mounted in a bracket extension projecting from the tubular bracket 383. The two cables are then extended outwardly above the pipe member 16, such cables being maintained under continuous tension corresponding to the counterbalancing force of the weight arm 364. The cable 377 is passed around a sheave 388 supported in a bracket extension projecting upwardly from the sleeve bracket 51 in which the forwardly extending hanger arm 49' is mounted. At the front end of said hanger arm is a sheave 389 and the cable 377 is extended forwardly and down over this sheave. The lower end of said cable is then connected through a turnbuckle 391 with the platform supporting arm 41$c$, at a point of attachment indicated at 393. The other cable 378 is continued out to a horizontal sheave 395 mounted on the sleeve bracket 51 of the outer hanger arm 49, and is thence extended forwardly and downwardly over a sheave 396 supported at the forward end of said hanger arm. This cable is then connected to the outer platform supporting arm 41$a$ through a turnbuckle 391, in the same manner as described of the cable 377. The front ends of these forwardly extending hanger arms 49 and 49' are braced by links 397 (Fig. 9) extending down to the pivot axis 42. It will be seen from the foregoing that the cables 377 and 378 distribute the counterbalancing force of the weighted arm 364 to the two outwardly disposed points of the harvester platform defined by the supporting arms 41a and 41c, whereby all points of the platform are equally counterbalanced. The distance from the pivot axis 42 to the rear point of attachment 379 of the cables is substantially the same as the distance from the pivot axis 42 to the front points of attachment 393 of the two cables with their respective platform supporting arms, and as a result these two arms 41a and 41c are maintained in a substantially parallel position with arm 410d as the platform is raised or lowered. In disconnecting the harvester platform from the draft beam for transport, the weight bar 364 is preferably disconnected from the platform supporting arm 410d by releasing the points of connection 367 and 368 so that a weight bar can be carried parallel to the platform to reduce the transport width of the latter.

In all other details, aside from the manner of counterbalancing the harvester platform, the embodiment illustrated in Figs. 8 and 9 may correspond exactly to the previously described embodiment, and accordingly in Figs. 8 and 9, I have not illustrated all of these details, in order to avoid obscuring the illustration. The rotary windrow forming device 191 may be embodied in this modified construction of implement, although, as illustrative of another alternative structure I have eliminated this device from the form of Figs. 8 and 9 and have shown all of the grain depositing fingers 165 as extending substantially the entire depth of the delivery opening 39, it being understood that this same structure and arrangement may be embodied in the form illustrated in Figs. 1 to 7, inclusive, if desired.

In each of the above described constructions certain advantages are obtained by having the grain depositing zone 39 located substantially at the inner extremity of the harvester platform, in proximity to the draft beam 17. Such location of the depositing zone disposes the windrow along the stubbleward side of the wide swath cut by the main cutter 37, where there is less likelihood of the windrow being run over and crushed by the bull wheel 14 on the next round of the harvester, such as might result from inaccurate guiding of the harvester or in steering movements. Furthermore, this arrangement simplifies the construction by requiring only a single conveyor belt 38 and its driving connections; also it disposes the rotary windrow forming device 191 where power can be more conveniently transmitted thereto; and, in addition, it enables the auxiliary cutter 170 and its driving connections to be mounted on the draft beam 17 whereby the main cutter 37 can be raised and lowered without disturbing the selected cutting height of the auxiliary cutter. Also, by cutting the windrow supporting swath substantially entirely between the marginal lines of the main swath the overall width of the machine is not increased. It will be understood that the auxiliary cutter is preferably disposed sufficiently low that the windrow supporting swath cut thereby constitutes a trough in the body of stubble to each side thereof, so that the windrow of grain is sheltered from the wind. However, if desired, the main cutter 37 can be lowered to substantially the same cutting height as the auxiliary cutter 170 through actuation of the adjusting lever 91, such being permitted without interference between the cutters because of the forward disposal of the auxiliary cutter.

While I have illustrated what I regard to be the preferred embodiment of my invention nevertheless it will be understood that such is merely exemplary and that numerous modifications and rearrangements of parts may be made without departing from the essence of the invention.

I claim:

1. In a harvesting machine, the combination of means for cutting the grain, means for conveying the cut grain to a point of delivery for depositing on the stubble in the form of a windrow, a rotating device adapted to engage the cut grain to assist in forming the windrow, and mechanism on the machine for rotating said windrow forming device.

2. In a harvesting machine, the combination of means for cutting the grain, means for conveying the cut grain to a point of delivery for depositing on the stubble in the form of a windrow, and a rotating device mounted on the machine out of contact with the ground adapted to engage the cut grain to assist in forming the windrow.

3. In a harvesting machine, the combination of means for cutting the grain, means for delivering the cut grain upon the stubble in the form of a windrow, and a rotating windrow forming device comprising projecting members adapted to engage portions of the cut grain for weaving the same into the body of the windrow.

4. In a harvesting machine, the combination of means for cutting the grain, said machine having a delivery zone at which the cut grain is deposited on the stubble in the form of a windrow, means for conveying cut grain to said delivery zone, and a rotating device adjacent to said delivery zone adapted to engage the cut grain to assist in forming the windrow.

5. In a harvesting machine, the combination of means for cutting the grain, said machine having a delivery zone at which the cut grain is deposited on the stubble in the form of a windrow, means for conveying cut grain to said delivery zone and discharging the grain at one side of said zone, and a rotating windrow forming device adjacent to the other side of said zone comprising means adapted to engage portions of the cut grain for forcing the same into the body of the windrow.

6. In a harvesting machine, the combination of means for cutting the grain, means for depositing the cut grain on the stubble in the form of a windrow, and a rotating device adapted to engage the cut grain to assist in forming the windrow, said device comprising rotating surfaces inclined to the line of the windrow for progressively pressing the grain into the windrow.

7. In a harvesting machine, the combination of means for cutting the grain, means for depositing the cut grain on the stubble in the form of a windrow, a rotating device for preventing the spreading of one side of said windrow, and a deflecting device for preventing the spreading of the other side of said windrow.

8. In a harvesting machine, the combination of means for cutting the grain, means for depositing cut grain upon the stubble in the form of a windrow, means moving relatively to said harvesting machine adapted to engage the cut grain to assist in forming the windrow, and mechanism on said machine for actuating said latter means.

9. In a harvesting machine, the combination of means for cutting the grain, means for depositing cut grain upon the stubble in the form of a windrow, means moving relatively to said machine and intersecting the path of the cut grain substantially at its point of deposit for weaving portions of the grain into the body of the windrow, and mechanism on said machine for actuating said latter means.

10. In a harvesting machine, the combination of means for cutting the grain, depositing means for lowering the cut grain upon the stubble in the form of a windrow, means for conveying cut grain to said depositing means, and means movably mounted on said machine adjacent to said depositing means having power driven motion for engaging the cut grain to assist in forming the windrow.

11. In a harvesting machine, the combination of means for cutting the grain, conveying means for conveying the cut grain to a point of delivery for depositing on the stubble in the form of a windrow, transmission mechanism for driving said conveying means, a plurality of laterally spaced depositing fingers at said point of delivery for lowering the cut grain upon the stubble without crushing the stubble, and mechanism manually actuated to raise said fingers substantially to non-depositing position and to interrupt the drive through said transmission mechanism substantially simultaneously, and manually actuated to restore said fingers to depositing position and to restore the drive through said transmission mechanism.

12. In a harvesting machine, the combination of means for cutting the grain, conveying means for conveying the cut grain to a point of delivery for depositing on the stubble in the form of a windrow, transmission mechanism for driving said conveying means including a clutch, a plurality of laterally spaced depositing fingers at said point of delivery for lowering the cut grain upon the stubble without bending or breaking the stubble, and manually tripped mechanism operating substantially simultaneously to raise said fingers substantially to non-depositing position and to release said clutch.

13. In a harvesting machine, the combination of means for cutting the grain, conveying means for conveying cut grain to a point of delivery for depositing on the stubble in the form of a windrow, transmission mechanism for driving said conveying means comprising a clutch, a control member controlling the engaging and releasing of said clutch to stop and start said conveying means, a plurality of longitudinally extending depositing fingers at said point of delivery for lowering the cut grain upon the stubble, a control member for raising and lowering said depositing means between non-depositing and depositing positions, and means manually actuated to actuate both of said control members for substantially simultaneously stopping said conveying means and raising said depositing means, and manually released to permit restarting of said conveying means and to permit lowering of said depositing means.

14. In a windrow harvester, the combination of a main cutter for cutting a relatively wide swath, means adapted to deposit the cut grain in a windrow, and an auxiliary cutter for cutting a windrow supporting swath in advance of the windrow being deposited thereon, said auxiliary cutter being positioned to have a portion of its cutting width overlap the cutting width of said main cutter.

15. In a windrow harvester, the combination of a main cutter for cutting a relatively wide swath, means for depositing grain cut thereby in a windrow, and an auxiliary cutter adapted to operate at a lower cutting height for cutting a relatively narrower windrow supporting swath in advance of the windrow being deposited thereon, said auxiliary cutter being positioned whereby a portion of the swath width thereof overlaps the swath width of the main cutter.

16. In a harvesting implement, the combination of a main cutter, conveying means for conveying the grain cut by said main cutter, and an auxiliary cutter disposed ahead of said main cutter in the path of advance thereof.

17. In a harvester, the combination of a main cutter, means for depositing grain cut thereby in a windrow, means for adjusting the cutting height of said main cutter, and an auxiliary cutter for cutting a windrow supporting swath in advance of the windrow being deposited thereon, said auxiliary cutter being positioned in advance of said main cutter whereby the latter may be lowered to approximately the same cutting height as said auxiliary cutter.

18. In a windrow harvester, the combination of a main cutter for cutting a relatively wide swath, means for depositing grain cut thereby in a windrow, means for adjusting the cutting height of said main cutter, and an auxiliary cutter for cutting a relatively narrower windrow supporting swath in advance of the windrow of grain being deposited thereon, said auxiliary cutter being positioned whereby substantially the entire width of said windrow supporting swath is disposed between lines extended along the margins of the relatively wide swath cut by said main cutter.

19. In a harvesting machine, the combination of a frame member, a vertically adjustable harvester platform detachably connected with said frame member, said harvester platform comprising a cutter bar and conveying means, counterbalancing spring means, mechanism including a cam lever and flexible means cooperating therewith for transmitting the stress of said spring means to said platform for counterbalancing the latter, and means for retaining said spring means under stress when said force transmitting mechanism is disconnected for detaching the harvester platform from said frame member.

20. In a harvesting machine, the combination of a frame member, a vertically adjustable harvester platform detachably connected with said frame member, said harvester platform comprising a cutter bar and conveying means, counterbalancing spring means mounted on said frame member and extending substantially longitudinally of the machine, mechanism for transmitting the tension of said spring means to said platform for substantially counterbalancing the latter, said mechanism including means movable substantially transversely of the machine, said mechanism being disconnectible to permit said harvester platform to be detached from said frame member, and means for retaining said spring means substantially under counterbalancing tension when said mechanism is disconnected.

21. In a harvesting machine, the combination of a harvesting platform, a reel cooperating therewith, a vertically adjustable reel support permitting raising and lowering of the reel, a first frame member on which said harvester platform and said reel support are mounted, a second frame member detachably connected with said first frame member, a reel adjusting control member mounted on said second frame member, and a train of motion transmitting parts extending from said control member to said adjustable reel support, said motion transmitting parts including means adapted to be locked to said first frame member for holding the reel against dropping when said train of parts is disconnected to permit the detaching of one of said frame members from the other.

22. In a harvester, the combination of a harvester platform, a reel cooperating therewith, an adjustable reel support permitting raising and lowering of said reel, and mechanism for transmitting a substantially uniform counterbalancing force to said reel in each of its different vertically adjusted positions comprising a pair of toggle links and spring means tending to move the toggle joint of said links in one direction.

23. In a harvester, the combination of a harvester platform, a reel cooperating therewith, an adjustable support for said reel permitting raising and lowering of said reel, and mechanism for transmitting a substantially uniform counterbalancing force to said reel in each of its different vertically adjusted positions comprising a pair of toggle links operatively connected with said reel support and arranged to approach a dead center relation as said reel support is elevated, and a tension spring operatively connected with said toggle links tending to move the latter toward dead center relation whereby in this direction of motion decreasing spring tension is compensated by increasing force exerted by the toggle.

24. In a harvester, the combination of a harvester platform, a reel cooperating therewith, adjustable reel supporting apparatus permitting raising and lowering of said reel, and mechanism for transmitting a substantially uniform counterbalancing force to said reel in each of its vertically adjusted positions comprising force transmitting means operative in one direction of motion to raise said reel, a member operatively connected to have limited motion with the raising and lowering of said reel, and counterbalancing spring means operatively connected between said force transmitting means and said member.

25. In a harvesting machine, the combination of a wheel supported frame comprising a forwardly extending draft beam, a harvester platform movably connected with said frame for vertical adjustment relatively thereto, said harvester platform carrying a sickle bar, conveyor and reel all rising and falling with said platform in the vertical adjustments thereof, a power distributing shaft mounted to rise and fall with said platform, power distributing connections between said shaft and said sickle bar, said conveyor and said reel, a driving element mounted on said wheel supported frame, and a driving connection between said driving element and said power distributing shaft accommodating the rise and fall of said harvester platform relatively to said frame.

26. In a harvesting machine, the combination of a wheel supported frame, a harvester platform movably connected with said frame for vertical adjustment relatively thereto, a counterweighted arm operatively connected with said harvester platform at one point, and flexible connections transmitting the counterbalancing force of said arm to other points of said harvester platform.

27. In a harvesting machine, the combination of means for conveying the cut grain to a point of delivery on the stubble in the form of a windrow, adjustable inclined depositing means of openwork formation for lowering the grain upon the stubble, means for holding said depositing means in different positions of adjustment, and supplementary cutting means for cutting the grain, said cutting, conveying and depositing means being arranged and cooperating whereby the cut grain is deposited on the stubble without bending or breaking the latter.

28. In a harvesting machine, the combination of a laterally extending cutting mechanism, a horizontal conveyor disposed back of said cutting mechanism and extending from the outer end of said cutting mechanism to a point spaced from the inner end of said cutting mechanism, said conveyor receiving grain cut by the cutting mechanism and delivering it laterally, a plurality of longitudinally extending and laterally spaced fingers situated in the space between the inner end of the conveyor and the inner end of the cutting mechanism positioned lower than the delivery end of said conveyor, said fingers checking the fall of cut grain delivered into said space from the delivery end of said conveyor and being rearwardly and downwardly inclined to gradually lower the cut grain in the form of a windrow and to transfer the weight thereof upon the stubble without crushing the stubble, the windrow resting upon the stubble aiding in withdrawing the cut grain from the fingers as the latter are drawn forward by the advance of the machine.

29. In a harvesting machine, the combination of a laterally extending cutting mechanism, a horizontal conveyor disposed back of said cutting mechanism and extending from the outer end of said cutting mechanism to a point spaced from the inner end of said cutting mechanism, said conveyor receiving grain cut by the cutting mechanism and delivering it laterally, a plurality of longitudinally extending and laterally spaced fingers situated in the space between the inner end of the conveyor and the inner end of the cutting mechanism positioned lower than the delivery end of said conveyor, said fingers checking the fall of cut grain delivered into said space from the delivery end of said conveyor and being rearwardly and downwardly inclined to gradually lower the cut grain in the form of a windrow and to transfer the weight thereof upon the stubble without crushing the stubble, the windrow resting upon the stubble aiding in withdrawing the cut grain from the fingers as the latter are drawn forward by the advance of the machine, and means for holding said fingers in different positions of adjustment.

ROBERT C. LIVESAY.